(12) United States Patent
Khramov et al.

(10) Patent No.: US 12,378,461 B2
(45) Date of Patent: Aug. 5, 2025

(54) METHODS OF FORMING ORGANOPHILIC FLUID LOSS MATERIALS, AND RELATED ORGANOPHILIC FLUID LOSS MATERIALS AND METHODS

(71) Applicant: Schlumberger Technology Corporation, Sugar Land, TX (US)

(72) Inventors: Dimitri Khramov, Katy, TX (US); Evgeny Barmatov, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/405,244

(22) Filed: Jan. 5, 2024

(65) Prior Publication Data

US 2025/0223486 A1    Jul. 10, 2025

(51) Int. Cl.
*E21B 21/00* (2006.01)
*C09K 8/44* (2006.01)
*E21B 43/34* (2006.01)

(52) U.S. Cl.
CPC .............. *C09K 8/44* (2013.01); *E21B 21/003* (2013.01)

(58) Field of Classification Search
CPC .......... C09K 8/44; E21B 21/003; E21B 43/34
USPC ........................................................ 166/282
See application file for complete search history.

(56) References Cited

U.S. PATENT DOCUMENTS

| | | | |
|---|---|---|---|
| 7,786,052 B2* | 8/2010 | Ballard | C09K 8/36 507/117 |
| 8,524,640 B2* | 9/2013 | Patel | C09K 8/502 166/305.1 |
| 2017/0198192 A1* | 7/2017 | Panamarathupalayam | C09K 8/12 |
| 2019/0055451 A1* | 2/2019 | Mohammed | C09K 8/36 |
| 2022/0177767 A1* | 6/2022 | Shumway | C09K 8/035 |

* cited by examiner

*Primary Examiner* — William D Hutton, Jr.
*Assistant Examiner* — Ashish K Varma
(74) *Attorney, Agent, or Firm* — R. Nicholas Buchmuller

(57) ABSTRACT

A method of forming a fluid loss material for a wellbore fluid includes mixing tannin at least one modifier to form a mixture, heating the mixture to a temperature greater than about 100° C. to react the tannin with the at least one modifier to form a modified tannin, and reacting the modified tannin with an amine to form an organophilic fluid loss material comprising the amine bonded to the modified tannin. Related organophilic fluid loss materials and methods of operating a wellbore are also disclosed.

18 Claims, 7 Drawing Sheets

METHODS OF FORMING ORGANOPHILIC FLUID LOSS MATERIALS, AND RELATED ORGANOPHILIC FLUID LOSS MATERIALS AND METHODS

CROSS-REFERENCE TO RELATED APPLICATIONS

N/A

BACKGROUND OF THE DISCLOSURE

Wellbore drilling operations include drilling a bore in a formation to access reservoirs of hydrocarbons and other subsurface resources. During drilling of a wellbore, various fluids may be circulated into the wellbore through a drill pipe and drill bit, and may subsequently flow upward through the wellbore to the surface. For example, a drilling fluid (e.g., an aqueous-based fluid or an oil-based fluid) may be pumped down the inside of the drill pipe, through the drill bit, and into the wellbore. The drilling fluid returns to the surface through the annulus. The drilling fluid may lubricate and cool the drill bit, facilitate transport of formation cuttings to the surface, prevent formation blowouts by maintaining a hydrostatic pressure greater than the formation pressure, maintain well stability, and reduce fluid loss to the formation.

In some instances, undesirable formation conditions may result in the loss of wellbore fluids (e.g., drilling fluids) to the formation. For example, wellbore fluids may leave the borehole through fissures and/or fractures in the formation or through a porous formation material (e.g., a porous rock matrix) surrounding the borehole. To reduce loss of the wellbore fluids, the wellbore fluid may include one or more fluid loss agents, such as xanthan gum and hydroxyethyl cellulose (HEC).

Methods of reducing the fluid loss during drilling and other operations include formulating a wellbore fluid, such as a drilling fluid, to form a filtercake on surfaces of the formation. The filtercake may substantially prevent or reduce the filtration of fluid from the wellbore to the formation.

After drilling operations are complete, the filtercake must be removed from surfaces of the formation in hydrocarbon bearing zones of the formation. Conventionally, the filtercake is broken by exposing the filtercake to one or more breakers, such as acids, acid precursors, and enzymes.

SUMMARY

In some embodiments, a method of forming a fluid loss material comprises mixing tannin at least one modifier to form a mixture, heating the mixture to a temperature greater than about 100° C. to react the tannin with the at least one modifier to form a modified tannin, and reacting the modified tannin with an amine to form an organophilic fluid loss material comprising the amine bonded to the modified tannin.

In some embodiments, a wellbore fluid comprises a base fluid, and an organophilic fluid loss material comprising reaction product of tannin, an amine, and at least one modifier.

In some embodiments, a method of operating a wellbore comprises pumping a drilling fluid into a wellbore extending through an earth formation, and forming a filtercake on surfaces of the earth formation. The drilling fluid comprises a base fluid, and an organophilic fluid loss material comprising a reaction product of tannin, an amine, and at least one modifier.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
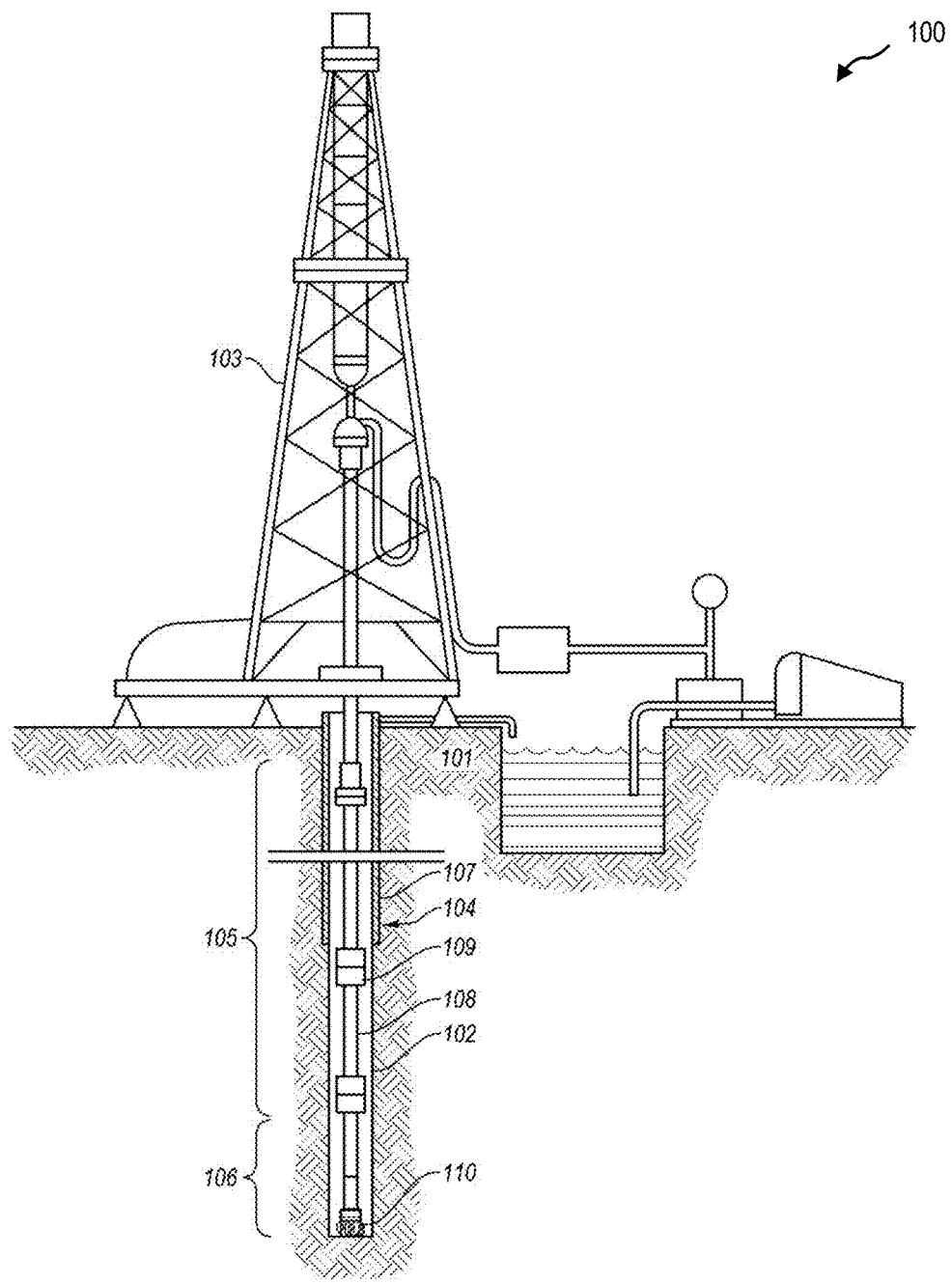
FIG. 1 is a representation of a drilling system for drilling an earth formation to form a wellbore, according to at least one embodiment of the present disclosure.

This disclosure generally relates to devices, systems, and methods of manufacturing and using wellbore fluid additives for downhole applications, such as mitigation of fluid loss using one or more fluid additives. The fluid additive may be used in a wellbore fluid, such as a drilling fluid, drill-in fluids (also referred to as "reservoir drill-in fluids" (RDF)), workover fluids, spacer fluids (e.g., a fluid introduced into the wellbore after a drilling fluid and prior to a cement composition to flush residual drilling fluid from the annulus), stimulation fluids, or other wellbore fluids. The fluid additive may be referred to herein as a "fluid loss material," a "lost-circulation material," a "fluid loss additive," or a "fluid loss control agent."

The fluid loss material may be provided as a component of the wellbore fluid, such as of a drilling fluid. In some embodiments, the fluid loss material is used in an oil-based or synthetic-based wellbore fluid (e.g., an oil-based drilling fluid or a synthetic-based drilling fluid, which may also be referred to as a non-aqueous drilling fluid or an invert emulsion drilling fluid).

The fluid loss material may comprise an amine-treated tannin exhibiting hydrophobic and organophilic properties. The organophilic properties of the amine-treated tannin facilitate the use of the fluid loss material in a non-aqueous wellbore fluid. In some embodiments, the fluid loss material comprises a reaction product of a tannin and an amine, such as a fatty (also referred to as a lipophilic) amine. The fatty amine may include one or more of a $C_6$ to $C_{22}$ fatty acid amine, another $C_6$ to $C_{22}$ alkyl amine or alkyl diamine, or hexamethyldiamine (HMDA). In some embodiments, the amine includes one or more of tallow alkylamine, stearylamine, dodecyl amine, oleyl amine, or hexamethylenediamine. In some embodiments, the fluid loss material includes a reaction product of the tannin, the amine, and at least one modifier configured to react with the tannin to form a modified tannin, which may, in turn, react with the amine to form the organophilic fluid loss material.

The tannin may be modified with at least one modifier prior to, or currently with, reacting with the amine. The at least one modifier may include one or more of at least one oxidizer, or at least one other modifier (e.g., at least one of formaldehyde, paraformaldehyde, glyoxal, glutaraldehyde, hexamethylenetetramine, or 5-hydroxy-1 methyl-1H-1,2,4-triazole-3-carboxylic acid (HMTCA)), or combinations thereof. In some embodiments, the tannin is modified with one or more oxidizers to form one or quinone groups (e.g., including one or more carbonyl groups (i.e., one or more C=O bonds) bonded to phenol groups, such as one or more benzoquinone groups). For example, one or more carbonyl groups may replace one or more hydroxyl groups of phenol groups of the tannin and may be directly bonded a carbon atom of an aromatic ring (an aryl group) of the tannin. In some such embodiments, the modified tannin may be referred to as "oxidized tannin." The oxidized tannin may react with the amine to form the fluid loss material. In some embodiments, the nitrogen atoms of the amine are bonded to a carbon atom of an aryl group of the tannin. The nitrogen atom may be single bonded or double bonded to the carbon atom of the aryl group of the tannin. In some embodiments, one or more carbon atoms of the aryl groups of the tannin is double bonded to an oxygen atom. In other embodiments, the amine is bonded to an alkyl chain that is, in turn, bonded to a carbon atom of the aryl group of the tannin.

In some embodiments, the oxidation of the tannin to form the oxidized tannin may be facilitated by mixing the tannin with sodium hydroxide or another based in a solution having a pH greater than about 10.0. The oxidized tannin may react with the amine to form the fluid loss material.

In some embodiments, the tannin is modified with one or more other modifiers, such as one or more of formaldehyde, paraformaldehyde, glyoxal, glutaraldehyde, hexamethylenetetramine (HMTA), or 5-hydroxy-1 methyl-1H-1,2,4-triazole-3-carboxylic acid to form the modified tannin. In some embodiments, the one or more other modifiers provide a source of formaldehyde. In some such embodiments, the modified tannin includes a benzylic alcohol (an alcohol comprising an alkyl alcohol bonded to a phenol group of the tannin). The modified tannin may be reacted with the amine to form the organophilic fluid loss material. In some such embodiments, the fluid loss material comprises an alkyl chain that is, in turn, bonded to a carbon atom of an aryl group of the tannin.

In some embodiments, the tannin is reacted with the amine, formaldehyde (or a source of formaldehyde), and a compound including an acidic proton next to a carbonyl functional group to form a β-amino-carbonyl compound by the Mannich reaction. In some embodiments, at least one hydroxyl group of the tannin is replaced with a carbonyl group.

Direct reaction of tannin with amines may be difficult to drive to completion without excessive temperatures. However, the excessive temperatures, in the presence of an oxygen source (e.g., air) may increase the risk of fires during the manufacturing process. It is believed that mixing fatty amines with tannin for directly reacting the fatty amines with the tannin does not sufficiently increase the pH of the reaction solution because the fatty amines are not water soluble. Further, the molar concentration of tannin is relatively low and the use of excessive fatty amines is expensive and wasteful. In addition, during the reaction, the material may exhibit an increase in viscosity and tackiness. For example, during the reaction, the reactants may change from a tacky material to a brittle material, increasing the difficulty of processing such materials and requiring high torque mixers, drum rollers, and/or extruders. Further, conventional processing methods result in a product that lacks in consistency (such as determined as a performance in a drilling fluid application). The organophilic fluid loss material formed according to embodiments described herein may be formed by forming a modified tannin, and reacting the modified tannin with the amine. The reaction between the modified tannin may proceed at a reaction rate faster than the reaction between unmodified tannin and an amine. In addition, the amine may be substantially completely reacted with the modified tannin and the reaction product may, therefore, include less residual amine compared to conventional processes. Residual amines, if present in the reaction product, may negatively affect the properties of the fluid loss material, such as by causing dispersion of reactive shales, forming amine salts between residual fatty amine and anionic emulsifiers that may be used in the drilling fluid, toxicity, and the reduction of low shear rheology (LSRV) and gelling of the fluid loss material.

In some embodiments, since the fluid loss material is formed by reacting the modified tannin and the amine, the reaction product may be chemically different than the reaction product of an unmodified tannin and the amine, improving the performance of the fluid loss material in, for example, drilling fluids (e.g., oil-based drilling fluids). In some embodiments, the fluid loss material comprising the reaction product of the modified tannin with the amine may include fewer hydroxyl groups compared to the reaction product of unmodified tannin with an amine. In addition, the reaction product may include at least one of one or more oxygen atoms double bonded to a carbon atom of an aromatic ring structure (e.g., of an aryl group) of the tannin, a nitrogen atom double bonded to a carbon atom of an aryl group of the tannin, or an alkyl group bonded to a carbon atom of an aryl group of the tannin and an amine (e.g., an alkyl amine) bonded to the alkyl group. In addition, the fluid loss material may include fewer unbound free amine compared to directly reacting tannin with the amine.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly ("BHA") 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between to the drill string 105 and the bit 110). Examples of additional BHA components include drill collars, stabilizers, measurement-while-drilling ("MWD") tools, logging-while-drilling ("LWD") tools, downhole motors, underreamers, section mills, hydraulic disconnects, jars, vibration or dampening tools, other components, or combinations of the foregoing. The BHA 106 may further include a rotary steerable system (RSS). The RSS may include directional drilling tools that change a direction of the bit 110, and thereby the trajectory of the wellbore. At least a portion of the RSS may maintain a geostationary position relative to an absolute reference frame, such as gravity, magnetic north, and/or true north. Using measurements obtained with the geostationary position, the RSS may locate the bit 110, change the course of the bit 110, and direct the directional drilling tools on a projected trajectory.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

During drilling operations, a drilling fluid may be used to facilitate lubrication and cooling of the bit 110 and removal of earth formation 101 cuttings. In some embodiments, such as during drilling of hydrocarbon-bearing zones (e.g., producing zones) of the earth formation 101, the drilling fluid may include one or more fluid loss materials (which may also be referred to as filtration control materials) formulated and configured to reduce and/or prevent the infiltration of wellbore fluids (e.g., the drilling fluid) to the earth formation 101, such as through the pores, fractures, cavities, and other parts of the earth formation 101. For example, the fluid loss materials may be formulated and configured to form a filter (e.g., a filtercake) on surfaces of the earth formation 101, the filtercake being substantially impermeable to wellbore fluids and formation fluids.

The drilling fluid may include a base fluid, the fluid loss material, and one or more additives (e.g., one or more of emulsifiers, surfactants, bridging materials, viscosifiers, thinners (e.g., dispersion aids), weighting materials, filtration control agents, shale stabilizers, pH buffers, corrosion inhibitors, emulsion activators, gelling agents, shale inhibitors, defoamers, foaming agents, scale inhibitors, solvents, rheological additives, or other additives).

The drilling fluid may include an aqueous-based drilling fluid or a non-aqueous-based drilling fluid (e.g., an oil-based drilling fluid, a synthetic-based drilling fluid). When lifting cuttings of the earth formation 101, the drilling fluid may be referred to as a "drilling mud." In some embodiments, the drilling fluid comprises a non-aqueous-based drilling fluid, such as an oil-based drilling fluid or a synthetic-based drilling fluid. In some such embodiments, the base fluid comprises an oleaginous or oil-based fluid and may include a natural or synthetic oil. An internal phase of an emulsion of the oleaginous or oil-based fluid may include one or more salts. In some embodiments the oleaginous fluid is selected from the group consisting of at least one of diesel oil, mineral oil, a synthetic oil, (e.g., hydrogenated and unhydrogenated olefins including polyalpha olefins, linear and branched olefins), polydiorganosiloxanes, siloxanes, organosiloxanes, or esters of fatty acids (e.g., straight chained, branched and cyclical alkyl ethers of fatty acids). In other embodiments, the drilling fluid includes an aqueous-based drilling fluid.

The one or more salts may provide a desired density to the drilling fluid and may also reduce the effect of the drilling fluid on hydratable clays and shales the earth formation 101. The salts may include salts of one or more of sodium, calcium, aluminum, magnesium, zinc, potassium, strontium, or lithium, and salts of one or more of chlorides, bromides, carbonates, iodides, chlorates, bromates, formates, nitrates, oxides, phosphates, sulfates, silicates, or fluorides. In some embodiments, the salt comprises a divalent halide, such as an alkaline earth halide (e.g., calcium chloride ($CaCl_2$)), calcium bromide ($CaBr_2$)), or a zinc halide. The salt may include cesium formate (HCOOR), sodium bromide (NaBr), potassium bromide (KBr), and cesium bromide (CsBr). The particular composition of the salt may be selected based on compatibility with the earth formation 101 and/or to match the brine phase of a completion fluid and/or a non-aqueous fluid.

In some embodiments, the weight percent of the salt is less than the weight percent of the base fluid. The salt may constitute from about 5.0 weight percent to about 50.0 weight percent of the drilling fluid, such as from about 5.0 weight percent to about 10.0 weight percent, from about 10.0 to about 20.0 weight percent, from about 20.0 weight percent to about 30.0 weight percent, from about 30.0 weight percent to about 4.0 weight percent, or from about 40.0 weight percent to about 50.0 weight percent of the drilling fluid. However, the disclosure is not so limited, and the weight percent of the salt and the water in the drilling fluid may be different than that described.

As described above, the drilling fluid may include at least one fluid loss material formulated and configured to reduce an amount of wellbore fluid (e.g., the drilling fluid) lost in the earth formation 101 (e.g., during drilling operations). For example, the fluid loss material may facilitate formation of a filtercake on porous surfaces of the earth formation 101. In some embodiments, the fluid loss material may be formulated and configured to from a filtercake on surfaces of the earth formation 101.

The fluid loss material may be organophilic. The fluid loss material may comprise a reaction product of tannin, at least one amine, and at least one of an oxidizer or another modifier. In some embodiments, the fluid loss material comprises a reaction product of tannin, at least one oxidizer, and at least one amine. In other embodiments, the fluid loss material comprises a reaction product of tannin, the amine, and one or more modifiers, such as one or more of formaldehyde, paraformaldehyde, glyoxal, glutaraldehyde, hexamethylenetetramine, or HMTCA The tannin may include a plant tannin, such as those found in the wood of one or more quebracho, chestnut, oak, eucalyptus, hemlock, pine, larch, and willow trees. Of course, the tannin may include tannin from sources other than those described. The tannin may include a polyphenolic compound. As used herein, a phenol group of tannin means and includes an aromatic ring (also referred to as an aryl group) (e.g., a benzyl group) bonded to one or more hydroxyl groups and may include one or more of phenol, a benzendiol (e.g., catechol (1,2-benzenediol or 2-hydroxyphenol), resorcinol (1,3-benzenediol or 3-hydroxyphenol), hydroquinone (1,4-benezndiol or 4-hydroxyphenol)) (also referred to as dihydroxylbenzenes), pyrogallol (benzene-1,2,3-triol), hydroxyquinol (benzene-1,2,4-triol), phloroglucinol (benzene-1,3,5-triol), or a tetrahydroxybenzene (e.g., 1,2,4,5-tetrahydroxylbenzene, 1,2,3,5-tetrahydroxybenzene, 1,2,4,5-tetrahydroxybenze).

In some embodiments, the tannin comprises condensed tannin. In some embodiments, the tannin does not include hydrolysable tannins, such as gallic acid derivatives. Reference to "tannins" herein refer to condensed tannins. The molecular weight of the tannin may range from about 500 to over about 3,000. The tannin may include a structure similar to the generic Structure (1) illustrated below, wherein n is an integer, the quantity of which depends on a molecular weight of the tannin. In Structure (1) below, the tannin may be linear wherein the tannin includes one or more bonds between A and B and/or the tannin may be branched, wherein the tannin includes one or more bonds between A and C (illustrated in dashed lines).

As shown in Structure (1), the tannin may include a plurality of hydroxyl groups. The tannin may exhibit hydrophilic properties. Accordingly, the tannin may be reacted with one or more amines (e.g., organophilic amines) to create a material exhibiting organophilic properties. For example, the tannin may be reacted with one or more reactants to form a modified tannin, and the modified tannin may react with the amine to form the organophilic fluid loss material. The modified tannin may more readily react with the amine than an unmodified tannin, facilitating the formation of a fluid loss material exhibiting improved properties compared to the reaction product of unmodified tannin with the amine. The tannin may be modified by one or more of oxidation or reaction with one or more other modifiers. In some embodiments, the modification (e.g., oxidation) of the tannin is facilitate by taking place in a basic solution.

In some embodiments, the tannin is oxidized to form the modified tannin. The modified tannin formed by the oxidation of the tannin may be referred to herein as "oxidized tannin." The oxidation of the tannin may be facilitated by the one or more hydroxyl groups of the phenol groups of the tannin. In some embodiments, the modified tannin includes one or more alkenol groups (also referred to as enol group). By way of non-limiting example, the oxidizer may react with the hydroxyl groups of the phenol groups of the tannin to form an alkenol (e.g., to replace the hydroxyl group with a carbon to oxygen double bond). In some embodiments, the modified tannin formed by the reaction of the tannin with the oxidizer includes one or more carbonyl functional groups (one or more C=O bonds). For example, the reaction product of the tannin and the oxidizer may include one or more carbon to oxygen double bonds replacing one or more hydroxyl groups of the tannin, as shown in Reaction (2) below, which illustrates an exemplary oxidation of catechol to form 1,2-benzoquinone:

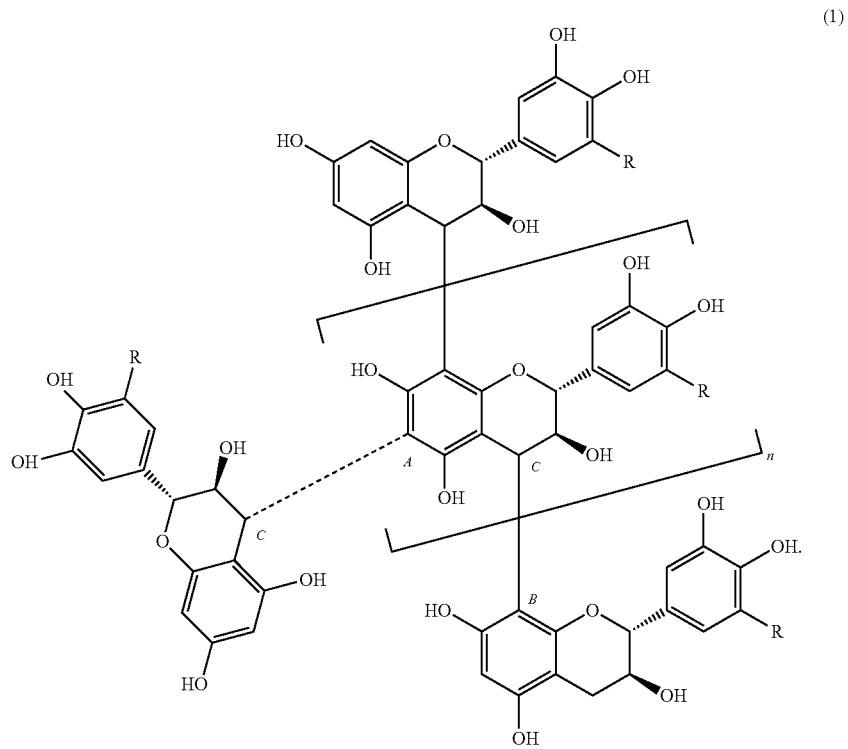

(1)

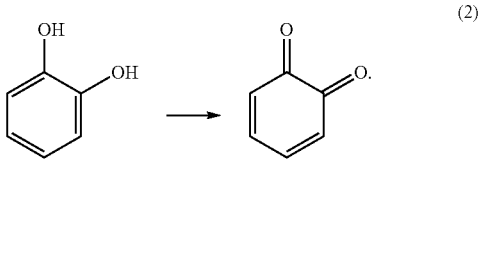 [SMILES: Oc1ccccc1O ; O=C1C=CC=CC1=O]

(2)

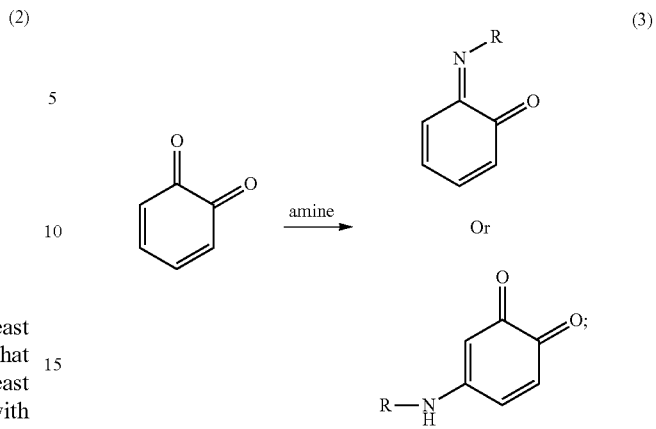

(3)

Accordingly, the oxidized tannin may include at least some carbon atoms of at least some of the aryl groups that are double bonded to an oxygen atom. In particular, at least some of the hydroxyl groups of the tannin are replaced with a carbon to oxygen double bond, the carbon atom part of the aryl (e.g., phenol) group of the tannin.

While Reaction (2) illustrates the oxidization of catechol, it will be understood that the tannin may include phenolic groups other than, or in addition to, catechol that may be oxidized. The oxidized tannin may comprise, for example, one or more quinones, such as one or more of 1,2-benzoquinone, 1,4-benzoquinone (also referred to as "paraquinone"), or 1,4-napthoquinone (if the tannin includes a naphthol group).

The oxidizers may include one or more of a peroxide (e.g., one or more of hydrogen peroxide, sodium peroxide ($Na_2O_2$), calcium peroxide ($CaO_2$), barium peroxide ($BaO_2$), tert-butyl hydroperoxide, or another peroxide) oxygen ($O_2$), a carbonate (e.g., calcium carbonate, magnesium carbonate), a percarbonate (e.g., sodium percarbonate), a peracetate (peroxyacetic acid), a persulfate (e.g., sodium peroxomonosulfate, potassium peroxymonosulfate, sodium persulfate, ammonium persulfate, potassium persulfate), hypochlorite (e.g., sodium hypochlorite), or another oxidizer. In other embodiments, the oxidizer comprises hydrogen peroxide.

In some embodiments, a rate of oxidation of the tannin may be increased and/or facilitated by exposing the tannin to a basic solution to form anionic tannin (e.g., anionic phenols, such as phenolates (e.g., sodium phenolates). The tannin may be mixed in a basic solution having a pH greater than about 11.0. For example, the tannin may be exposed to a basic solution having a pH within a range of from about 11.0 to about 12.0 to form the anionic tannin. In some embodiments, the tannin is exposed to sodium hydroxide at a pH within a range of from about 11.0 to about 12.0, such as from about 11.0 to about 11.5, or from about 11.5 to about 12.0. In some embodiments, the tannin may be exposed to the oxidizer in a basic solution. The basic solution may comprise, for example, sodium hydroxide (caustic), calcium hydroxide, potassium hydroxide, cesium hydroxide, another hydroxide, a tribasic sodium phosphate ($Na_3PO_4$) (such as sodium phosphate tribasic dodecahydrate ($Na_3PO_4 \cdot 12H_2O$)). In some embodiments, the oxidizer and the base comprise the same material composition. For example, in some embodiments, the oxidizer and the base include one or more or calcium peroxide or sodium peroxide.

Responsive to forming the modified tannin comprising oxidized tannin, the modified tannin may be exposed to the amine to form a reaction product of the modified tannin and the amine, according to Reaction (3) below:

wherein the amine comprises one or more $C_6$ to $C_{22}$ fatty acid amines (e.g., amines formed (derived) from a $C_6$ to $C_{22}$ fatty acid, or hexamethylenediamine (HDMA). While Reaction (3) illustrates a single aryl group reacting with the amine, it will be understood that the modified tannin includes several aryl groups, at least some of which may be reacted with the amine as shown in Reaction (3).

The amine may include an aliphatic amine. The fatty acid from which the Co to $C_{22}$ fatty acid amines are derived may comprise $C_6$ to $C_{22}$ fatty acids, such as one or more of caproic acid, enanthic acid, caprylic acid, pelargonic acid, capric acid, undecylic acid, lauric acid, tridecylic acid, myrisitic acid, pentadecylic acid, palmitic acid, margaric acid, stearic acid, nonadecylic acid, arachidic acid, heneicosylic acid, benenic acid, tricosylic acid, lignoceric acid, pentacosylic acid, cerotic acid, carboceric acid, montanic acid, nonacosylic acid, melissic acid, hentriacontylic acid, lacceroic acid, psyllic acid, geddic acid, ceroplastic acid, hexatricontylic acid, heptatricontylic acid, linolenic acid, stearidonic acid, cervonic acid, linolelaidic acid, palmitoleic acid, vaccenic acid, paullinic acid, oleic acid, or another fatty acid. In some embodiments, R comprises an alkyl group, such as an alkyl chain having 6 to 22 carbon atoms. The carbon chain may be straight, or may be branched, and may include one or more substituted groups. In some embodiments, the amine comprises an alky amine (and R comprises an alkyl group). In other embodiments, the amine comprises an alkyl diamine (and R comprises an alkyl amine). In some embodiments, the amine comprises a dialkylamine and the alkyl chains may comprise the same or comprise different alkyl groups. In some embodiments, the amine comprises an etheramine, such as a fatty amine ethoxylate. In some embodiments, the amine comprises a propoxylated and/or an ethoxylated amine. In some embodiments, the amine comprises a $C_{36}$ dimer amine (e.g., formed by $C_{18}$ amines).

The amine may be saturated or may be unsaturated. In some embodiments, the amine comprises one or more corsamine PT (tallow alkylamine), stearylamine (octadecyl amine), dodecyl amine, oleyl amine, or 1,6-hexamethylenediamine. In some embodiments, the amine is saturated (e.g., one or more of tallow amine (e.g., tallow alkylamine), stearylamine, dodecyl amine, hexamethylenediamine). In other embodiments, the amine is unsaturated (e.g., oleyl amine). In some embodiments, the amine comprises a monoamine (e.g., tallow alkylamine, stearylamine, dodecyl amine, oleyl amine). In other embodiments, the amine comprises a diamine (e.g., hexamethylenediamine).

The modified tannin may be reacted with more than one type of amine. For example, in some embodiments, the modified tannin is reacted with at least one of tallow alkylamine, stearylamine, dodecyl amine, oleyl amine, hexamethylenediamine, or hexamethylenetetramine (HMTA), and at least another amine (e.g., at least another of the tallow alkylamine, stearylamine, dodecyl amine, oleyl amine, hexamethylenediamine, or hexamethylenetetramine). In some embodiments, the amine includes hexamethylenetetramine and at least another amine.

In some embodiments, the reaction product of the modified tannin and the amine comprises one or more quinone groups bonded to at least one amine group. The reaction product may include an aromatic ring (an aryl group), wherein the amine is bonded to one of the carbon atoms of the aromatic ring and an oxygen atom is double bonded to another of the carbon atoms of the aromatic ring. By way of non-limiting example, the reaction product may include one or more groups including 4-(methyl)amino-1,2-benzoquinone, aminoquinone ($C_6H_5NO_2$), or another benzoquinone group bonded to at least one amino group. In some embodiments, the reaction product comprises one or more aromatic rings, wherein at least one carbon atom of the aromatic ring is double bonded to an oxygen, and at least one carbon atom of the aromatic ring is single bonded or double bonded to a nitrogen atom of an amine group.

In some embodiments, the fluid loss material comprises a reaction product of the tannin, the amine, and one or more modifiers (other than, or in addition to, the oxidizers and the bases described above). The tannin and the amine may be substantially the same as previously described. The one or more modifiers may include one or more of an aldehyde (e.g., formaldehyde, glyoxal, glutaraldehyde), paraformaldehyde, hexamethylenetetramine, or 5-hydroxy-1-methyl-1H-1,2,4-triazole-3-carboxylic acid (HMTCA) (or 5-hydroxymethyl)-1-methyl-1,2,4-triazole-3-carboxylate).

Without being bound by any particular theory, it is believed that the modifiers comprise a source of formaldehyde, which facilitates modification of the tannin. It is believed that the hydroxyl groups of the phenol groups of the tannin act as a nucleophile when interacting with the one or more modifiers to produce a benzylic alcohol that can then react with the amine nucleophile. As described herein, the benzylic alcohol may react with the amine to form the fluid loss material.

By way of non-limiting example, in some embodiments, the modifier comprises formaldehyde and reacts with phenol groups of the tannin according to Reaction Scheme (4) below to modify the tannin (e.g., with an additional hydroxyl group) to form the modified tannin including one or more benzylic alcohol groups. The modified tannin may react with the amine to form the fluid loss material comprising an alkyl amine bonded to the phenol group of the tannin. For example, in embodiments where the modifier comprises formaldehyde, the modified tannin includes a methanol group bonded to the phenol groups of the tannin, as shown in Reaction Scheme (4).

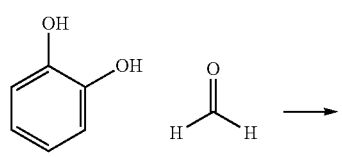

(4)

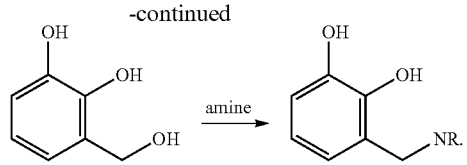

In some embodiments, such as where the modifier comprises a longer chain aldehyde, the modified tannin includes benzylic alcohol including a longer chain alcohol (e.g., an alkyl alcohol) bonded to the phenol groups of the tannin.

With reference to Reaction Scheme (4), in some embodiments, the fluid loss material includes one or more phenol groups, wherein at least one carbon atom of the phenol group is bonded to an alkyl group, that is, in turn, bonded to an alkyl amine. In Reaction Scheme (4), R may include an alkyl group, which may be saturated or unsaturated, and may be linear or branched. The R group may include one or more additional functional groups and may include, for example, one or more of an ester group, an alcohol group, an alkene group, an alkyne group, a carbonyl group, a carboxylic group, another amine group, or another group). In some embodiments, the nitrogen of the amine group may not be directly bonded to the aromatic ring of the phenol group. As described above, while Reaction Scheme (4) illustrates that the nitrogen atom of the amine is bonded to a methyl group that is, in turn, bonded to the phenol group, the disclosure is not so limited. In other embodiments, the nitrogen atom of the amine group may be bonded to another alkyl group that is, in turn, bonded to the phenol group.

In some embodiments, the fluid loss material is formed by reacting the tannin with the amine in the Mannich reaction. The Mannich reaction involves the amino alkylation of an acidic proton next to a carbonyl functional group (C═O) by formaldehyde and an amine (or ammonia) to form a β-amino-carbonyl compound. In some embodiments, the tannin is modified, such as by oxidation, to form carbonyl functional groups bonded to the phenol groups of the tannin, and the modified tannin is reacted with the aldehyde and the amine to form the fluid loss material. In some embodiments, the reaction product is substantially the same as the reaction product illustrated and described with reference to Reaction Scheme (4) and includes one or more phenol groups, wherein at least one carbon atom of the phenol group is bonded to an alkyl group that is, in turn, bonded to an alkyl amine.

A weight ratio of the tannin (or the modified tannin) to the amine may be within a range of from about 1.0:1.0 to about 5.0:1.0, such as from about 1.0:1.0 to about 2.0:1.0, from about 2.0:1.0 to about 3.0:1.0, from about 3.0:1.0 to about 4.0:1.0, from about 4.0:1.0 to about 5.0:1.0, or form about 5.0:1.0 to about 6.0:1.0. In some embodiments, the weight ratio of the modified tannin to the amine is about 4.0:1.0. In some embodiments, the fluid loss material comprises a greater weight percent of the modified tannin than of the amine.

The fluid loss material may be formed by mixing the tannin with the one or more modifiers (e.g., one or more oxidizers, one or more other modifiers) in a reaction vessel to form a mixture. The mixture may be heated to a temperature within a range of from about 100° C. to about 160° C., such as from about 100° C. to about 115° C., from about 115° C. to about 130° C., from about 130° C. to about 145° C., or from about 145° C. to about 160° C. In some embodiments, the temperature is heated to about 130° C. In other embodiments, the mixture is heated to about 160° C.

The mixture may be heated for from about 4.0 hours to about 7.0 hours, such as from about 4.0 hours to about 5.0 hours, from about 5.0 hours to about 6.0 hours, or from about 6.0 hours to about 7.0 hours. However, the disclosure is not so limited, and the mixture may be heated to a different temperature and/or for a difference duration that those described.

In some embodiments, the mixture is heated to a first temperature for a first duration, followed by heating the mixture to a second temperature greater than the first temperature for a second duration. For example, in some embodiments, the mixture is heated to about 130° C. for a first duration (e.g., from about 1.0 hour to about 3.0 hours, such as about 2.0 hours), and then the mixture is heated to about 160° C. for a second duration (e.g., from about 3.0 hours to about 5.0 hours).

The fluid loss material may constitute from about 0.1 weight percent to about 10.0 weight percent of the wellbore fluid, such as from about 0.1 weight percent to about 0.2 weight percent, from about 0.2 weight percent to about 0.5 weight percent, from about 0.5 weight percent to about 1.0 weight percent, from about 1.0 weight percent to about 2.0 weight percent, from about 2.0 weight percent to about 3.0 weight percent, from about 3.0 weight percent to about 5.0 weight percent, or from about 5.0 weight percent to about 10.0 weight percent of the wellbore fluid. In some embodiments, the fluid loss material constitutes from about 0.1 weight percent to about 5.0 weight percent of the wellbore fluid.

The fluid loss material may be present in the wellbore fluid at a concentration within a range of from about 0.1 pounds per barrel (ppb) to about 40 ppb, such as from about 0.1 ppb to about 0.5 ppb, from about 0.5 ppb to about 1.0 ppb, from about 1.0 ppb to about 2.0 ppb, from about 2.0 ppb to about 5.0 ppb, from about 5.0 ppb to about 10.0 ppb, from about 10.0 ppb to about 20.0 ppb, or from about 20.0 ppb to about 40.0 ppb. However the disclosure is not so limited, and the fluid loss material may be present in the wellbore fluid at a different concentration that that described.

The wellbore fluid may further include one or more additives selected based on the desired properties of the wellbore fluid. As discussed above, and by way of non-limiting example, the one or more additional additives may include one or more of emulsifiers, surfactants, bridging materials, viscosifiers, thinners, weighting materials, filtration control agents, shale stabilizers, pH buffers, corrosion inhibitors, emulsion activators, gelling agents, shale inhibitors, defoamers, foaming agents, scale inhibitors, solvents, rheological additives, or other additives that may be suitable depending on the particular operation.

The emulsifiers may include calcium polyvalent metal soaps, phosphate esters, fatty acids, fatty acid soaps, alkylbenzene sulfonate, lime, amidoamines, polyamides, polyamines, oleate esters (e.g., sorbitan monoleate, sorbitan dioleate), and imidazolines. The corrosion inhibitor may include iron oxide, aluminum bisulfate, zinc carbonate, zinc chromate, an amine, or another material. The gelling agent may include one or more of a clay and a crosslinked polyvinylpyrrolidone, an acrylamide copolymer, guar, sodium bentonite, or another material. The shale inhibitor may include one or more of amine tartaric salt, ammonium lauric salt, polyammonium, alkyl diammonium, an amphoteric polymer, an organosilicate polymer, a silicone polymer, or another material. Defoamers may include one or more of 2-octanol, oleic acid, paraffinic waxes, amide waxes, sulfonated oils, organic phosphates, silicone oils, mineral oils, or dimethylpolysiloxane.

The surfactants may include anionic surfactants, cationic surfactants, and/or non-ionic surfactants. The foaming agents may include a nonionic surfactant including polymeric materials. The scale inhibitors may include an acrylic acid polymer, a maleic acid polymer, or a phosphonate. The solvents may include hydrocarbon solvents.

The bridging materials may include one or more of calcium carbonate, magnesium citrate, calcium citrate, calcium succinate, calcium maleate, calcium tartrate, magnesium tartrate, bismuth citrate, other suspended salts, mica, nutshells, fibers, or other building materials. In some embodiments, the building materials comprise calcium carbonate. The bridging material may be functionalized with one or more functional groups, such as one or more hydrophobic functional groups.

Viscosifiers of the wellbore fluid may include a material formulated and configured to increase the viscosity of the wellbore fluid and, optionally, to facilitate formation of a filtercake between the earth formation 101 and one or more of (e.g., each of) the drill string 105, casing 107, and liners. The viscosifier may include, for example, organic bentonite clay, an organic polymer (e.g., a cellulosic polymer), a polymer (e.g., a copolymer) formed from at least one acrylamide monomer and at least one sulfonated anionic monomer, or another polymer.

The viscosifier may constitute from about 0.5 weight percent to about 6.0 weight percent of the wellbore fluid, such as from about 0.5 weight percent to about 1.0 weight percent, from about 1.0 weight percent to about 2.0 weight percent, from about 2.0 weight percent to about 3.0 weight percent, or from about 3.0 weight percent to about 6.0 weight percent of the wellbore fluid. However, the disclosure is not so limited, and the weight percent of the viscosifier in the wellbore fluid may be different than that described.

Wellbore fluid thinners may include lignosulfates, lignitic materials, modified lignosulfonates, polyphosphates, tannin, and polyacrylates. The thinners may facilitate improved rheological properties of the wellbore fluid (e.g., a reduction in flow resistance) and a reduction in gel development. In addition, the thinner may reduce a thickness of filtercakes formed by the wellbore fluid, counteract the effects of salts, and reduce the effects of water on the earth formation 101.

Weighting materials (also referred to as "weighting agents") may include one or more of barite ($BaSO_4$), iron oxide (e.g., $Fe_2O_3$, $Fe_3O_4$), calcium carbonate ($CaCO_3$), magnesium carbonate ($MgCO_3$), manganese oxide ($Mn_3O_4$), or combinations thereof. The weighting material may be present in the wellbore fluid and facilitate increasing the density of the wellbore fluid up to about 2.88 $g/cm^3$ (about 24 pounds per gallon (ppg)).

A density of the wellbore fluid may be within a range of from about 1,080 $kg/m^3$ to about 2,500 $kg/m^3$, such as from about 1,080 $kg/m^3$ to about 1,200 $kg/m^3$, from about 1,200 $kg/m^3$ to about 1,400 $kg/m^3$, from about 1,400 $kg/m^3$ to about 1,600 $kg/m^3$, from about 1,600 $kg/m^3$ to about 1,800 $kg/m^3$, from about 1,800 $kg/m^3$ to about 2,000 $kg/m^3$, from about 2,000 $kg/m^3$ to about 2,200 $kg/m^3$, or from about 2,200 $kg/m^3$ to about 2,500 $kg/m^3$. However, the disclosure is not so limited, and the density of the wellbore fluid may be different than that described.

In use and operation, the fluid loss material may be added to a wellbore fluid, such as to a non-aqueous-based drilling fluid (e.g., an oil-based drilling fluid, a synthetic drilling fluid). The wellbore fluid including the fluid loss material may function as a filtration control additive. For example, in some embodiments, the wellbore fluid including the fluid loss material forms a filtercake on surfaces of the earth formation 101 and/or otherwise forms a filter on surfaces of the earth formation 101. The filtercake may substantially reduce (e.g., prevent) infiltration of wellbore fluids from the wellbore 102 to the earth formation 101.

Figure 2:
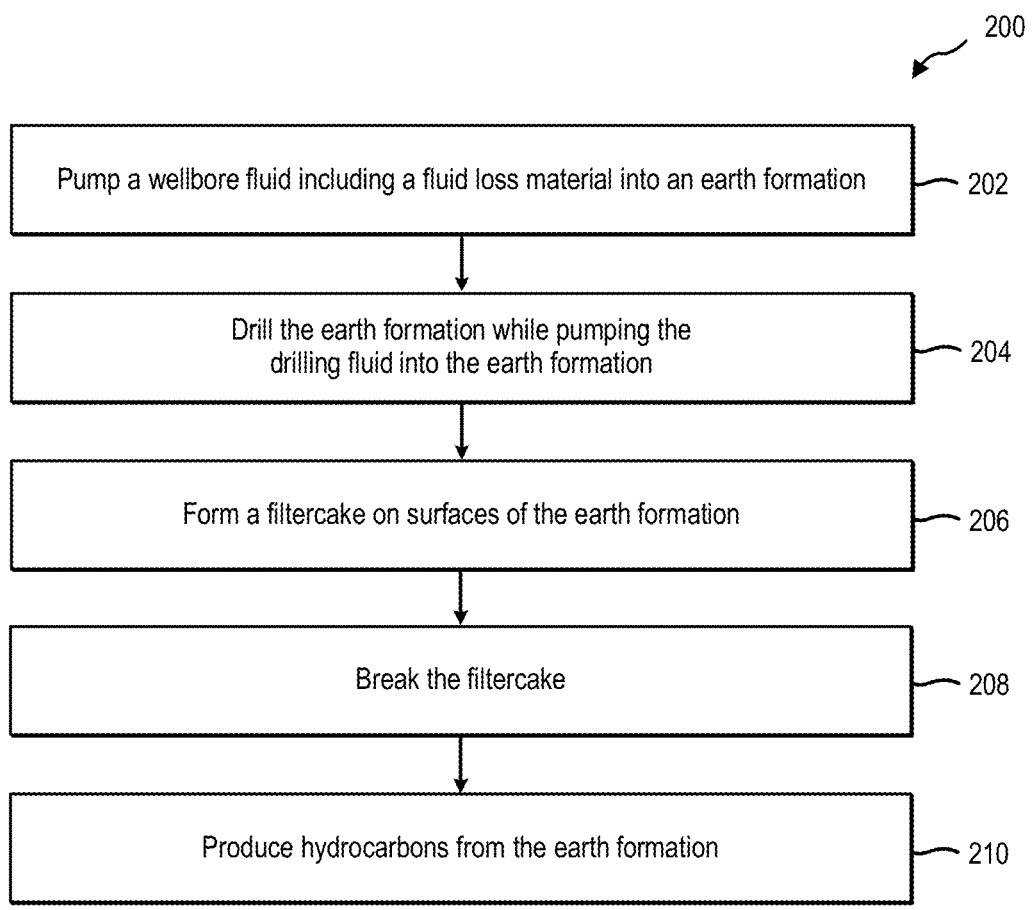
FIG. 2 is a simplified flow diagram illustrating a method of drilling a wellbore, according to at least one embodiment of the disclosure.

FIG. 2 is a simplified flow diagram illustrating a method 200 of operating a wellbore, according to at least one embodiment of the disclosure. The method 200 includes pumping a wellbore fluid including a fluid loss material into an earth formation, as shown at act 202. The fluid loss material may include one or more of the fluid loss materials described above. The wellbore fluid may include, for example, a base fluid, the fluid loss material, the bridging material, and one or more additives, as described above. In some embodiments, the wellbore fluid comprises a drilling fluid.

The method 200 may further include drilling the earth formation while pumping the drilling fluid into the earth formation, as shown at act 204. In some embodiments, the wellbore fluid is circulated through the drill string, out of the drill bit, and through the annulus between the drill string and the earth formation. The wellbore fluid may facilitate removal of cuttings from the wellbore as the wellbore fluid circulates through the wellbore.

With continued reference to FIG. 2, the method 200 may include forming a filtercake on surfaces of the earth formation, as shown at act 206. In some embodiments, a filtercake is formed on surfaces of the earth formation (such as on hydrocarbon producing zones of the earth formation) defining the wellbore. The filtercake may be formed of and include the fluid loss material. For example, the filtercake may include hydrophobically modified tannin, wherein the tannin is modified with one more hydrophobic amine groups.

The method 200 may further include breaking the filtercake, as shown in act 208. Breaking the filtercake may include exposing the filtercake to one or more breakers. The breakers may include one or more acids, one or more acid precursors, one or more enzymes, one or more chelating agents, or one or more other breaker materials formulated and configured to degrade the filtercake.

The method 200 may further include producing hydrocarbons from the earth formation through hydrophobic channels of the filtercake, as shown in act 210. For example, responsive to completing a drilling operation, hydrocarbons may be produced from the earth formation through the hydrophobic channels of the filtercake. The hydrocarbons may be produced without degrading (e.g., breaking) the filtercake, such as by exposing the filtercake to breaker chemicals (e.g., acids, enzymes) formulated and configured to degrade the filtercake. Producing the hydrocarbons without degrading the filtercake may advantageously extend the operating life of wellbore equipment and may reduce costs and time associated with producing the hydrocarbons compared to embodiments where the filtercake is degraded and removed prior to production of hydrocarbons.

Figure 3:
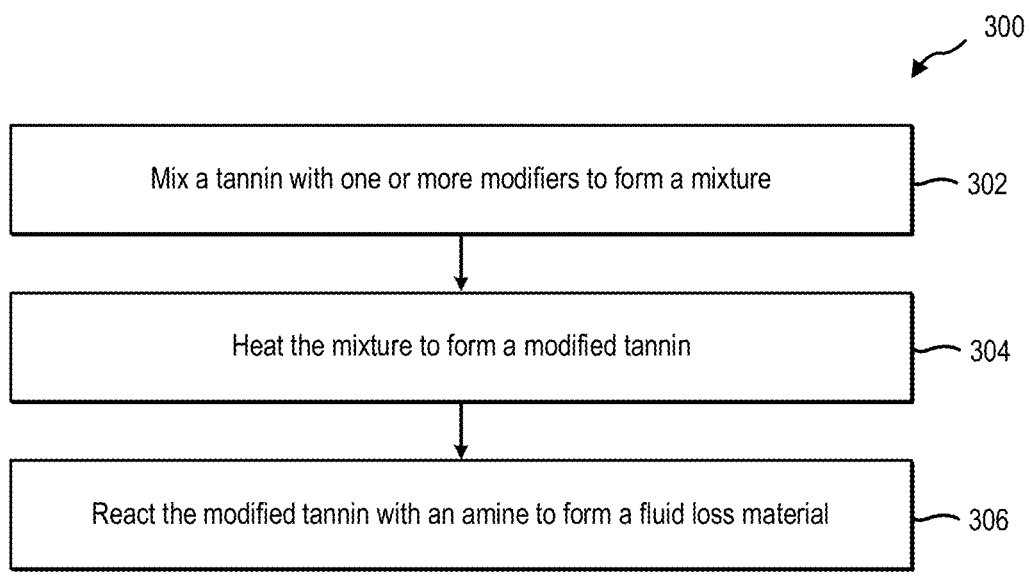
FIG. 3 is a simplified flow diagram illustrating a method of forming a fluid loss material, according to at least one embodiment of the disclosure.

FIG. 3 is a simplified flow chart illustrating a method 300 of forming the fluid loss material, according to at least one embodiment of the disclosure. The method 300 includes mixing tannin with one or more modifiers to form a mixture, as shown in act 302. The tannin may be the same as that described above. The one or more modifiers may include one or more of an oxidizer, or another modifier (e.g., one or more of formaldehyde, paraformaldehyde, hexamethylenetetramine, glyoxal, glutaraldehyde, or HMTCA.

The method 300 further includes heating the mixture to form a modified tannin, as shown in act 304. The modified tannin may include one or more of oxidized tannin or tannin including one or more benzylic alcohol groups. Heating the mixture may include heating the mixture to a temperature within a range of from about 100° C. to about 160° C. In some embodiments, the mixture is heated to a first temperature for a first duration, followed by heated to a second temperature greater than the first temperature for a second duration.

Responsive to forming the modified tannin, the method 300 further includes reacting the modified tannin with an amine to form a fluid loss material, as shown in act 306. The amine may include one or more of the materials described above and the fluid loss material may include one or more of the fluid loss materials described above.

Forming the fluid loss material according to the embodiments described herein facilitates forming the fluid loss material to include fewer unreacted (free) amine compared to methods in which the tannin is directed reacted with the amine (e.g., without creating a modified amine). The resulting fluid loss material exhibits improved properties, such as less reactive shale dispersion, fewer amine salts (that undesirably react with emulsifiers, resulting in an unstable internal phase), and an improved low-shear-rate viscosity (LSRV) compared to fluid loss materials that include tannins directly reacted with an amine. In addition, since the reaction product includes less free amines compared to fluid loss materials formed from the direct reaction of tannin with amine, the fluid loss materials described herein may not suffer from toxicity issues resulting from free amines.

EXAMPLES

Fluid loss materials were formed by reacting tannin with different amines at different temperatures and reaction times. Table I below includes various samples of reactants and reaction conditions under which different fluid loss materials were formed.

TABLE 1

| Sample | Reaction composition | Temperature and time (in hours) |
|---|---|---|
| 479 | Tannin (40 g)-NaOH (0 g)-Water (60 g)-Corsamine PT (10 g) | 130° C. (5 h) |
| 508 | Tannin (40 g)-NaOH (0 g)-Water (60 g)-Corsamine PT (10 g) | 130° C. (2 h) and 160° C. (4 h) |
| 478 | Tannin (40 g)-NaOH (2.4 g)-Water (58 g)-Corsamine PT (10 g) | 130° C. (5 h) |
| 492 | Tannin (40 g)-NaOH (12 g)-Water (48 g)-Corsamine PT (10 g) | 130° C. (5 h) |
| 495 | Tannin (40 g)-NaOH (0 g)-Water (60 g)-Corsamine PT (10 g)-Na-Tos (0.5 g) | 130° C. (5 h) |

TABLE 1-continued

| Sample | Reaction composition | Temperature and time (in hours) |
|---|---|---|
| 514 | Tannin (40 g)-NaOH (2.4 g)-Water (58 g)-Stearamine (10 g) | 130° C. (2 h) and 160° C. (4 h) |
| 515 | Tannin (40 g)-NaOH (2.4 g)-Water (58 g)-Dodecyl amine (10 g) | 130° C. (2 h) and 160° C. (4 h) |
| 480 | Tannin (40 g)-NaOH (0 g)-Water (610 g)-HMDA (10 g) | 130° C. (5 h) |
| 477 | Tannin (40 g)-NaOH (2.4 g)-Water (58 g)-HMDA (10 g) | 130° C. (5 h) |
| 516 | Tannin (40 g)-NaOH (2.4 g)-Water (58 g)-HMDA (10 g) | 130° C. (2 h) and 160° C. (4 h) |
| 519 | Tannin (40 g)-NaOH (2.4 g)-Water (58 g)-HMDA (10 g)-HMTA (1 g) | 130° C. (2 h) and 160° C. (4 h) |
| 488 | Tannin (40 g)-NaOH (0 g)-Water (60 g)-HMTA (4 g) | 130° C. (5 h) |
| 480 | Tannin (40 g)-NaOH (0 g)-Water (61 g)-HMTA (10 g) | 130° C. (5 h) |
| 487 | Tannin (40 g)-NaOH (2.4 g)-Water (58 g)-HMTA (4 g) | 130° C. (5 h) |
| 489 | Tannin (40 g)-NaOH (0 g)-Water (60 g)-HMTA (4 g)-Na-Tos (0.5 g) | 130° C. (5 h) |
| 491 | Tannin (40 g)-0.1M HCl (60 g)-HMTA (4 g) | 130° C. (5 h) |
| 512 | Tannin (40 g)-NaOH (2.4 g)-Water (58 g)-HMTA (1 g) | 130° C. (2 h) and 160° C. (4 h) |
| 510 | Tannin (40 g)-NaOH (2.4 g)-Water (58 g)-HMTA (4 g) | 130° C. (2 h) and 160° C. (4 h) |
| 513 | Tannin (40 g)-NaOH (2.4 g)-Water (58 g)-HMTA (8 g) | 130° C. (2 h) and 160° C. (4 h) |
| 493 | Tannin (40 g)-NaOH (2.4 g)-Water (58 g)-Corsamine PT (10 g), HMTA (1 g) | 130° C. (5 h) |
| 509 | Tannin (40 g)-NaOH (2.4 g)-Water (58 g)-Corsamine PT (10 g), HMTA (1 g) | 130° C. (2 h) and 160° C. (4 h) |
| 511 | Tannin (40 g)-NaOH (2.4 g)-Water (58 g)-Corsamine PT (10 g), HMTA (4 g) | 130° C. (2 h) and 160° C. (4 h) |
| 518 | Tannin (40 g)-NaOH (2.4 g)-Water (58 g)-Dodecyl amine (10 g)- HMTA (1 g) | 130° C. (2 h) and 160° C. (4 h) |
| 517 | Tannin (40 g)-NaOH (2.4 g)-Water (58 g)-Stearamine (10 g)- HMTA (1 g) | 130° C. (2 h) and 160° C. (4 h) |

Each of the reaction mixtures were mixed and heated for the indicated temperatures and times. The reaction products were dried and ground into a powder, which was then added to a drilling fluid composition. The drilling fluid composition included the composition shown in Table 2, wherein the tannin represents the fluid loss materials of the samples in Table 1.

TABLE 2

| Material | Pounds per barrel (ppb) |
|---|---|
| Synthetic base fluid (Amodril ® 1000) | 139 |
| Emulsifier | 10.00 |
| Wetting agent | 0 |
| Rheology conditioner | 3.00 |
| Lime | 10.00 |
| 25% CaCl₂ brine | 64.5 |
| Polymeric fluid loss additive | 4.00 |
| Tannin (samples) | 10.00 |
| Sepiolite | 14.00 |
| Mirconized barite | 333 |

Figure 4:
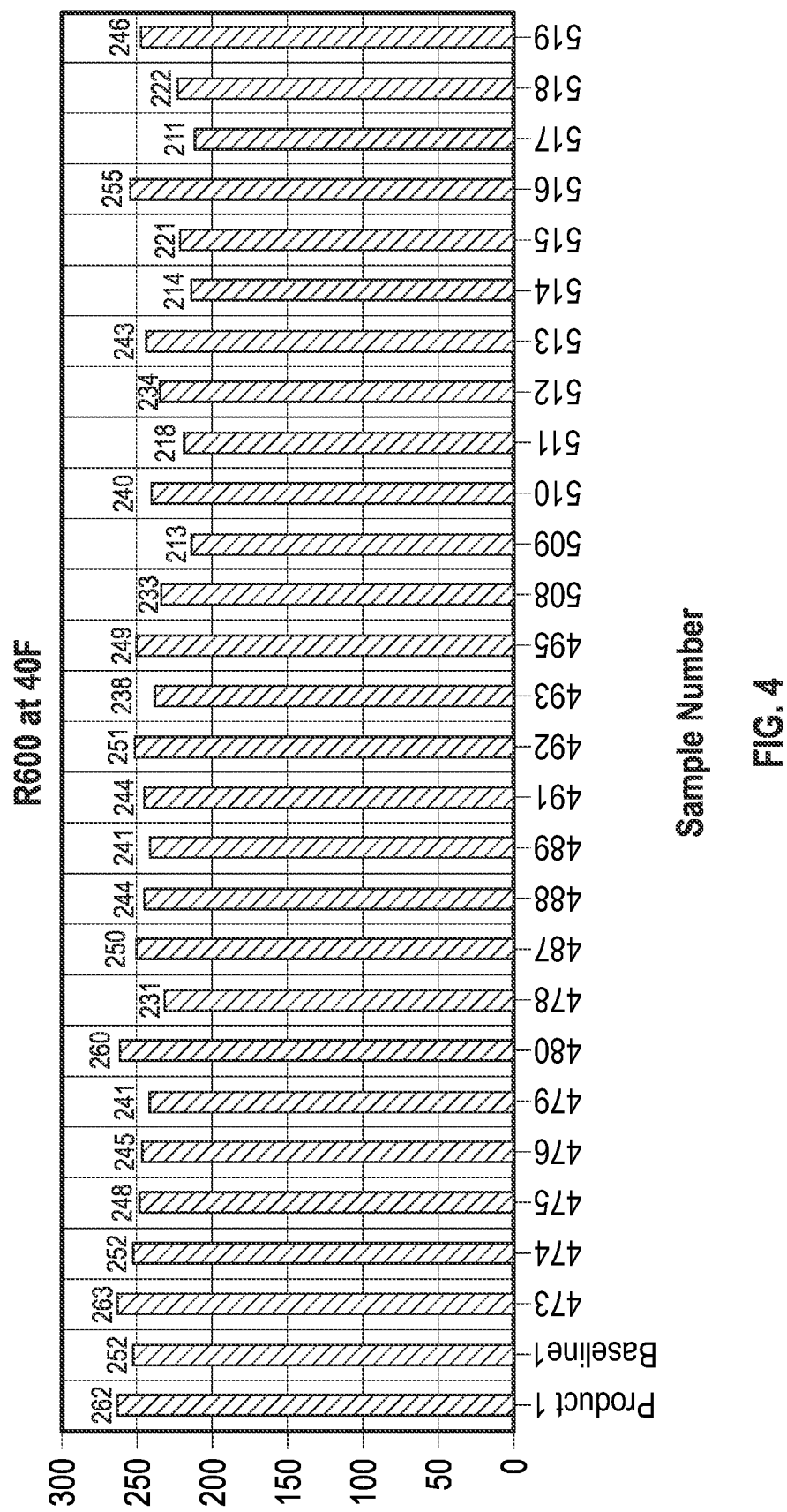
FIG. 4 is a simplified chart illustrating shear stress of various drilling fluids including various fluid loss materials during a R600 shear stress test at 40° F. (about 4.4° C.)
Figure 5:
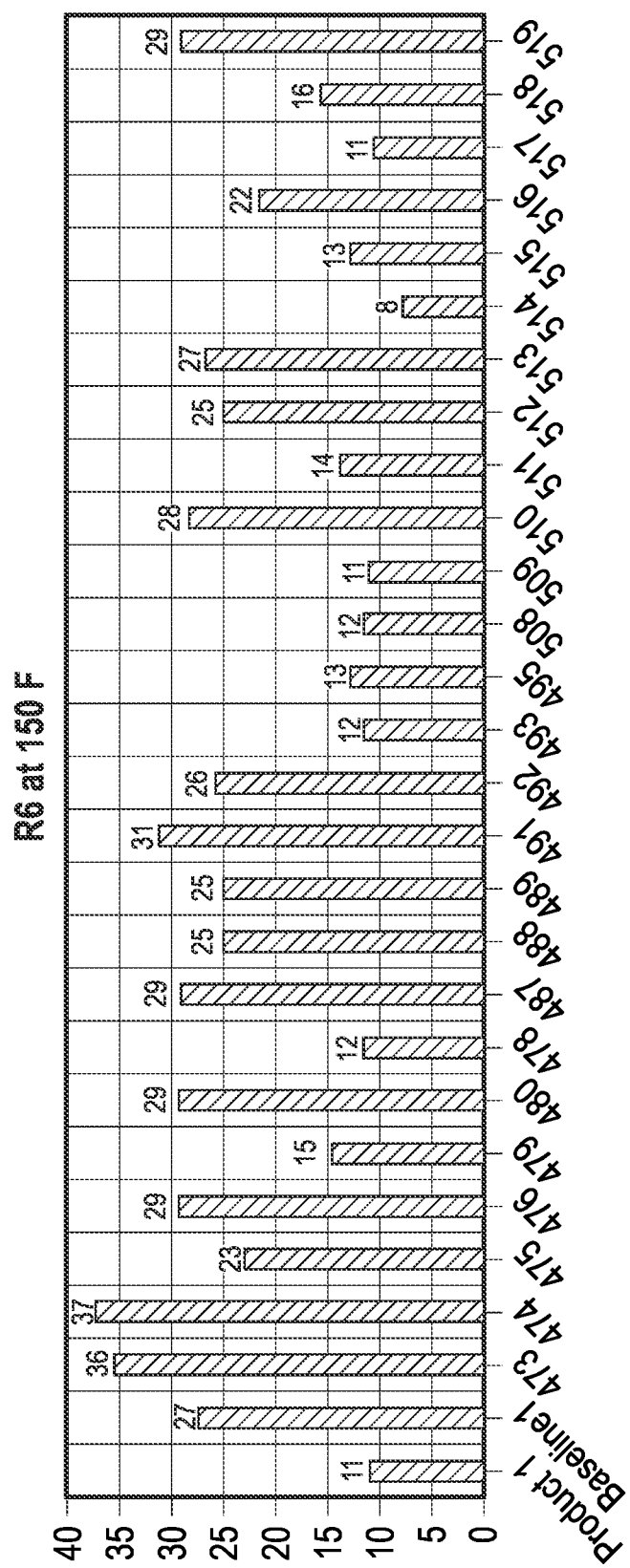
FIG. 5 is a simplified chart illustrating shear stress of the drilling fluids during a R6 shear stress test at 150° F. (about 65.6° C.)
Figure 6:
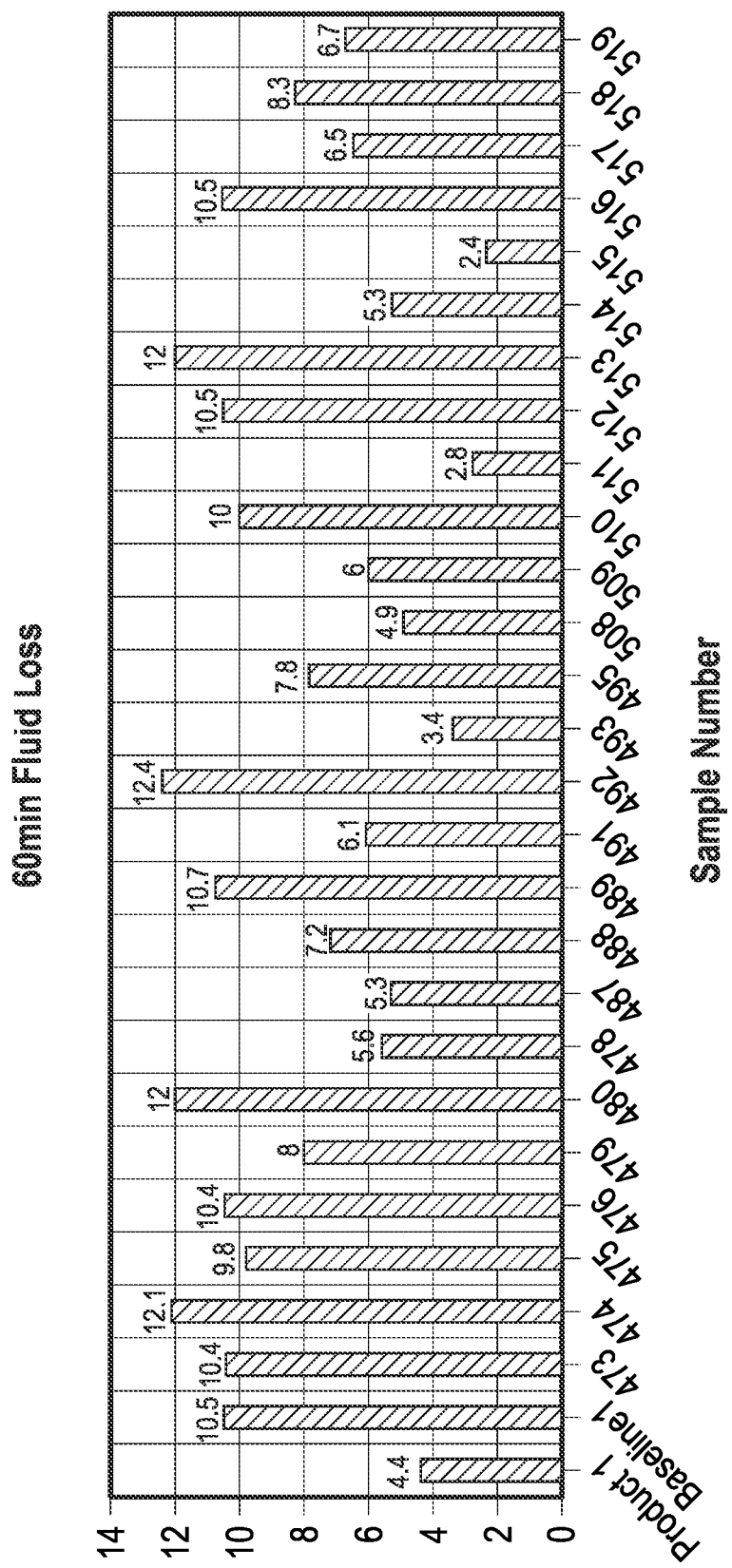
FIG. 6 is a simplified chart illustrating the fluid loss of the drilling fluids after 60 minutes during an API fluid-loss test.

The drilling fluid composition exhibited a density of about 14.00 pounds per barrel (about 39.9 kg/m$^3$) and a ratio of the volume percent of the synthetic fluid to the volume percent of water in composition (SWR %) was about 80.0%. FIG. 4 is a simplified chart illustrating shear stress (the Fann shear stress) of drilling fluids in which the same amount of the samples were mixed. The drilling fluids were hot rolled for 16 hours at about 365° F. (about 185° C.). FIG. 4 illustrates a R600 shear stress of the drilling fluids at 40° F. (about 4.4° C.) after hot rolling using a Fann rhotometer at 600 rotations per minute (RPM). In FIG. 4, the Product 1 is a drilling fluid including a comparative fluid loss additive comprising tannin modified according to direct reaction between tannin and a modifier, and Baseline 1 corresponds to a drilling fluid including an equivalent amount of unmodified tannin. FIG. 5 is a simplified chart illustrating the shear stress of the drilling fluids during a R6 shear stress test at 150° F. (about 65.6° C.) after hot rolling, wherein the cylinder of the rheometer is rotated at about 6 RPM. FIG. 6 is a simplified chart illustrating the fluid loss of the drilling fluids when exposed to HPHT testing at a differential pressure of about 500 psi (about 3.45 MPa) after 60 minutes using a WFAO-A disk for filtration under an API HPHT fluid-loss test. With collective reference to FIG. 4 through FIG. 6, samples 493, 511, and 515 exhibited significant reduction in the fluid loss compared to the Baseline 1 sample and the other samples. In addition, samples 493, 511, and 515 exhibited a relatively lower shear rate viscosity compared to the other samples and the Baseline 1 sample. With reference to FIG. 6, samples 493, 511, and 515 exhibited improved fluid retention compared to Baseline 1 sample, the Product 1 sample, and the other samples. Comparison of the different drilling fluids indicates that unless modified successfully, the tannin may not function as a suitable fluid loss material and may not sufficiently control the rheology of the drilling fluid. For example, the unmodified tannin of Baseline 1 sample exhibited poor rheological properties at low shear and relatively high fluid loss. In addition, drilling fluids including the tannin of Product 1 that was modified by direct reaction with an amine did not result in fluid retention as good as that of drilling fluids including an equivalent amount of samples 493, 511, or 515. Further, tannin modified by direct reaction with an amine does not consistently product materials having consistent and uniform properties, such as fluid loss properties.

Figure 7:
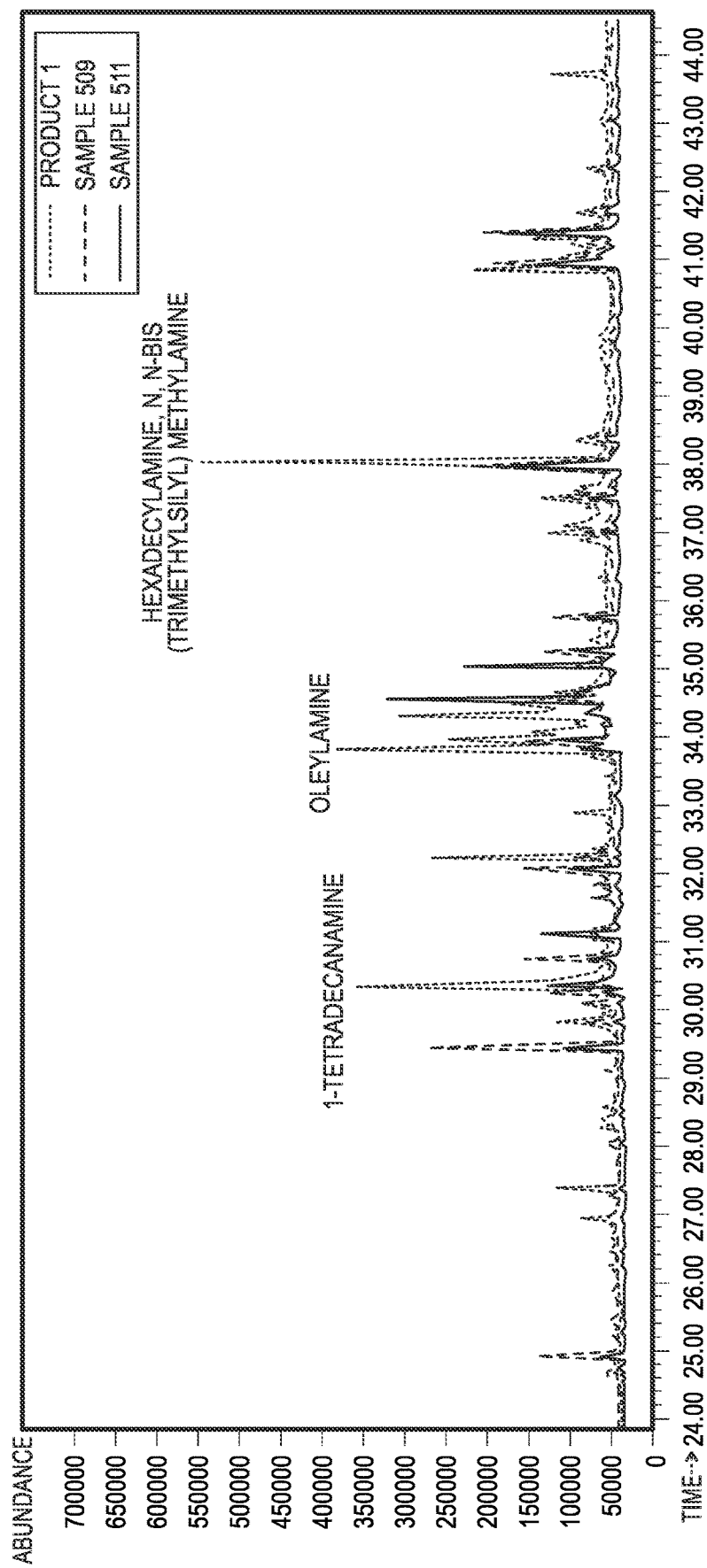
FIG. 7 is a chart illustrating gas chromatography-mass spectrometry data some of the drilling fluids of FIG. 4 through FIG. 6.

FIG. 7 is a chart illustrating gas chromatography-mass spectrometry data of drilling fluids including Product 1 illustrated in FIG. 4 through FIG. 6, sample 509, and sample 511, each of which was derivatized with N,O-bis(trimethylsilyl)trifluoroacetamide (BTSFA) prior to the BC-MS analysis. In FIG. 7, sample 511 included lipophilic tannin derivatized with N,O-bis(trimethylsilyl)trifluoroacetamide (BTSFA). As shown in FIG. 7, sample 509 and sample 511 include fewer free amines compared to Product 1. For example, sample 509 and sample 511 included lower peaks corresponding to 1-tetradecanamine, oleylamine, hexadecylamine, and N,N-bis(trimehtylsilyl)methylamine. Accordingly, sample 509 and sample 511 included less free amine that conventional fluid loss materials. Fluid loss materials formed according to methods described herein may achieve a more efficient amine coupling between the amine and the tannin, facilitating the use of less amine to form the fluid loss material compared to compared to fluid loss additives formed by the direct reaction of tannin with an amine.

The embodiments of wellbore (e.g., drilling) fluids including the fluid loss materials have been primarily described with reference to wellbore drilling operations; the wellbore fluids including fluid loss materials described herein may be used in applications other than the drilling of a wellbore. In other embodiments, drilling fluids including the fluid loss materials according to the present disclosure may be used outside a wellbore or other downhole environment used for the exploration or production of natural resources. For instance, drilling fluids including the fluid loss materials of the present disclosure may be used in a borehole used for placement of utility lines. Accordingly, the terms "wellbore," "borehole," and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that is within standard manufacturing or process tolerances, or which still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of forming a fluid loss material for a wellbore fluid, the method comprising:
   mixing tannin with at least one modifier to form a mixture, wherein mixing tannin with at least one modifier comprises mixing the tannin with an oxidizer;
   heating the mixture to a temperature greater than about 100° C. to react the tannin with the at least one modifier to form a modified tannin; and
   reacting the modified tannin with an amine to form an organophilic fluid loss material comprising the amine bonded to the modified tannin.

2. The method of claim 1, wherein mixing tannin with at least one modifier to form a mixture comprises mixing the tannin with a base to form the mixture to have a pH greater than about 10.0.

3. The method of claim 1, wherein mixing tannin with at least one modifier to form a mixture comprises mixing tannin with an oxidizer comprising hydrogen peroxide or a peroxide.

4. The method of claim 1, wherein mixing tannin with at least one modifier comprises mixing the tannin with at least one of formaldehyde, paraformaldehyde, hexamethylenetetramine, glyoxal, glutaraldehyde, or 5-hydroxy-1-methyl-1H-1,2,4-triazole-3-carboxylic acid (HMTCA).

5. The method of claim 1, wherein mixing tannin with at least one modifier comprises mixing the tannin with hexamethylenetetramine.

6. The method of claim 1, wherein reacting the modified tannin with an amine comprises reacting the modified tannin with at least one of tallow alkylamine, stearylamine, dodecyl amine, oleyl amine, or hexamethylenediamine.

7. The method of claim 1, wherein heating the mixture to a temperature greater than about 100° C. to react the tannin with the at least one modifier to form a modified tannin comprises forming the modified tannin to comprise one or more quinone groups.

8. The method of claim 1, wherein reacting the modified tannin with an amine comprises forming the organophilic fluid loss material, wherein one or more phenol groups of the modified tannin is bonded to an alkyl group and the alkyl group is bonded to an amine group.

9. The method of claim 1, wherein reacting the modified tannin with an amine comprises forming the organophilic fluid loss material comprising at least one aryl group wherein at least one carbon atom of the at least one aryl group is double bonded to an oxygen atom.

10. A wellbore fluid, comprising:
a base fluid; and
an organophilic fluid loss material comprising a reaction product of:
a modified tannin, wherein the modified tannin is modified with at least one oxidizer; and
an amine.

11. The wellbore fluid of claim 10, wherein the fluid loss material comprises a reaction product of the modified tannin, the amine, and at least one of formaldehyde, paraformaldehyde, hexamethylenetetramine, glyoxal, glutaraldehyde, or HMTCA.

12. The wellbore fluid of claim 10, wherein the amine comprises a $C_6$ to a $C_{22}$ alkyl amine.

13. The wellbore fluid of claim 10, wherein the amine comprises at least one of tallow alkylamine, stearylamine, dodecyl amine, oleyl amine, or hexamethylenediamine.

14. The wellbore fluid of claim 10, wherein the amine comprises a saturated amine.

15. The wellbore fluid of claim 10, wherein the amine comprises at least one of dodecyl amine, oleyl amine, or stearylamine.

16. The wellbore fluid of claim 10, wherein the reaction product comprises an amine group bonded to a carbon atom of a quinone group.

17. The wellbore fluid of claim 10, wherein the reaction product comprises a nitrogen atom double bonded to a carbon atom of a quinone group.

18. A method of operating a wellbore, the method comprising:
pumping a drilling fluid into a wellbore extending through an earth formation, the drilling fluid comprising:
a base fluid; and
an organophilic fluid loss material comprising a reaction product of:
a modified tannin, wherein the modified tannin is modified with at least one oxidizer; and
an amine; and
forming a filtercake on surfaces of the earth formation.

* * * * *